May 17, 1955     V. B. SCHMALTZ     2,708,331
DEVICE FOR COOLING SPECTACLE LENSES SUBJECTED
TO THE ACTION OF A BEVEL EDGING MACHINE
Filed April 6, 1953
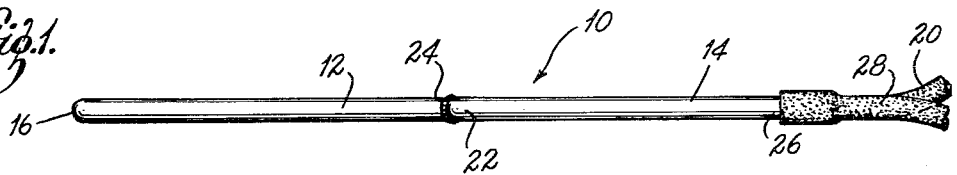
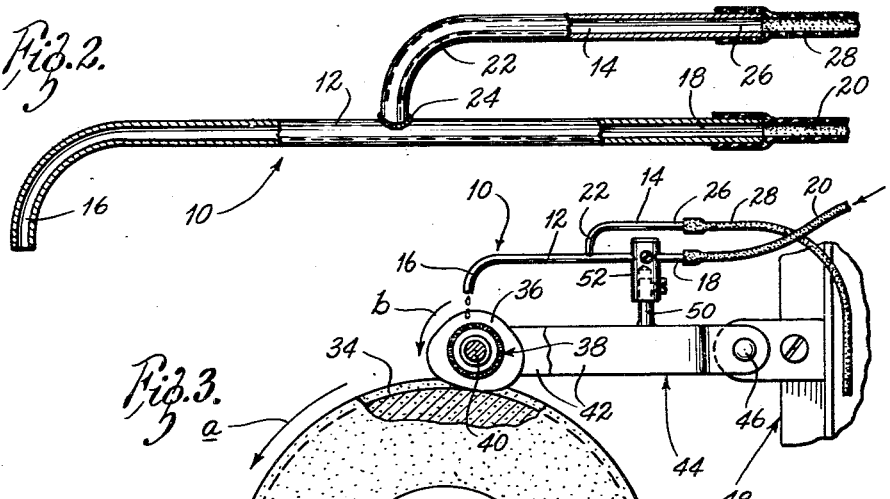
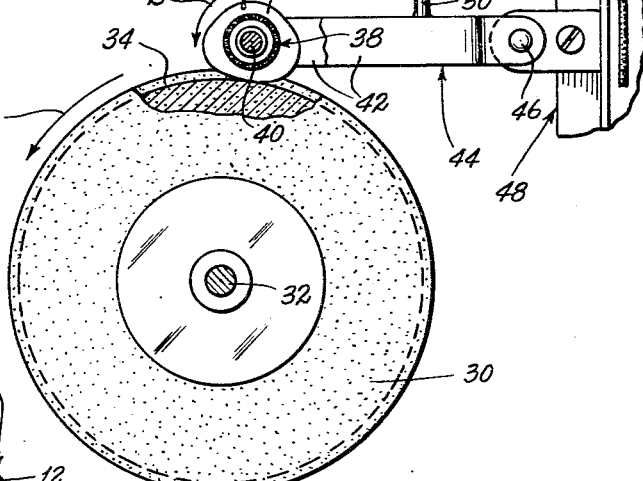
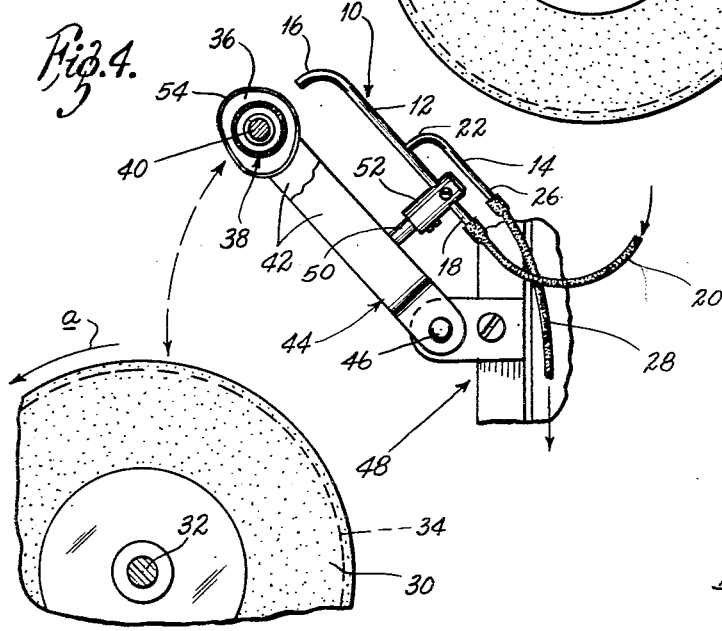
INVENTOR:
VINCENT B. SCHMALTZ,
By George J. Mager
HIS ATTORNEY United States Patent Office 2,708,331
Patented May 17, 1955

2,708,331
DEVICE FOR COOLING SPECTACLE LENSES SUBJECTED TO THE ACTION OF A BEVEL EDGING MACHINE
Vincent B. Schmaltz, St. Louis, Mo., assignor of one-half to Harry W. Mitchler, St. Louis, Mo.
Application April 6, 1953, Serial No. 347,105
1 Claim. (Cl. 51—266)

The present invention relates to an improved device for effectively cooling a spectacle lens during the time it is being subjected to the grinding action of a bevel edging machine.

More particularly, this invention provides an improved device for attaining the above-mentioned purpose without at the same time impairing the related mechanism of the machine, as will appear.

One of the most important steps in the process of producing a pair of spectacles resides in providing a bevelled edge along the entire peripheral margin of each lens, said edge cooperating with a complementary internal groove formed in the frame whereby to retain the lens in position, as is understood.

Such a bevelled edge is produced by subjecting the lens to the grinding action of a bevel edging machine, after first cutting the lens to the desired peripheral configuration.

Generally, conventional bevel edging machines of the type herein contemplated include a motor-driven grinding wheel provided with a circumferential V-groove; a chuck for the insertion and removal of a lens; a spindle or drive shaft for the chuck; a carriage one end of which is pivotally mounted on the machine and the free end of which rotatably supports the chuck spindle; a separate motor for driving said spindle through a train of interposed reduction gearing also supported by the carriage; manually operable means for swinging the carriage downwardly to dispose a lens supported in the chuck into proper engagement with the V-groove of the grinding wheel; and automatically functioning means for elevating the carriage to facilitate removal of the lens following completion of the bevelled edging operation. This type of machine is well known in the industry, and therefore it is not considered necessary to illustrate or describe the mechanism thereof in detail.

When the machine is in use, the grinding wheel revolves continuously at a speed of between six and seven hundred revolutions per minute. The chuck spindle however, revolves very slowly, so that the lens is rotated incrementally until the entire periphery thereof has been beveled. Immediately thereupon, the carriage is automatically swung upwardly whereby a switch is actuated to de-energize the spindle drive motor.

Manifestly in consequence of the grinding action, considerable heat is engendered, and since lenses are of a fragile nature, breakage of them frequently resulted. In order to alleviate this disadvantage, means were provided heretofore for maintaining the grinding wheel V-groove moist. This however only partially solved the problem.

More recently, an attachment in the form of a tube terminating at one end in a spout portion has been devised for mounting on the carriage aforesaid. The spout end portion of the tube is directed toward the chuck center, and terminates in a plane sufficiently thereabove to accommodate insertion of variously sized lenses. The other end portion of the tube is connected by means of a flexible hose to the faucet of a water pipe, so that with said faucet only minutely open, tap water in successive drops trickles onto the lens, when with the carriage down, the beveling operation is in progress.

This arrangement has reduced lens breakage to a minimum, in that the continuous dribble of water onto and downwardly across the lens effectively prevents heating thereof.

Whereas the attachment referred to has solved the lens breakage problem, it has been found to create another problem the solution of which is the primary object of my invention.

In other words, it obviously would be a tedious and time-wasting task to manipulate the faucet to open and closed position for each beveling operation. Thus the water continues to dribble when the carriage is in its raised position for the removal of one lens and insertion of the next. At such times, the water drops onto the gear train, splashes onto the carriage-operating and other mechanism, and eventually impairs the smooth operation of the machine.

As a result, it has been requisite to shut off the machine at intervals in order to wipe and lubricate the bespattered parts. To perform this task each time the machine is to remain idle for hours is imperative to prevent corrosion.

The principal object of the present invention is to provide means on such a device for draining therefrom the water supplied when the carriage is in elevated position. To this end, I provide a drain tube of similar diameter, but shorter than and disposed in spaced parallel relation to the supply tube. One end of said drain tube terminates in an arcuate portion rigidly secured to the supply tube and in fluid communication therewith. One end of a flexible hose is connected to the other end of said drain tube and leads to a suitable sump.

A more detailed description of the invention follows with reference to the accompanying drawing, wherein:

Figure 1 is a top plan view of a device incorporating the principles of the present invention, and portions of the flexible hose connections associated therewith;

Figure 2 is a side elevational view thereof, the flexible hose connections and portions of the device being illustrated in vertical section;

Figure 3 is a schematic view in side elevation of selected elements of a conventional bevel edging machine, illustrating the disposition of the invention during a bevel edging operation; and Figure 4 is a similar view illustrating the disposition of the invention subsequent to a bevel edging operation and prior to a repetition thereof.

The improved device comprising the instant invention is designated in its entirety by the numeral 10. It includes a first or feed tube 12, and a second or drain tube 14 rigid therewith and supported thereby as will appear.

The water feed tube 12 terminates at what will be considered its forward end in a downturned arcuate spout segment 16. The opposite, or what will be considered the rear end of said tube, comprises an inlet segment designated 18, which as shown particularly in Figure 2, is embraced by the discharge end of a flexible hose 20.

The drain tube 14 terminates at its forward end in an arcuate segment 22, brazed as suggested at 24, or otherwise rigidly secured to the tube 12 in a manner to establish fluid communication between said tubes. Preferably as illustrated, the tube 14 is disposed in spaced parallel relation to the tube 12. In the depicted embodiment of the invention, the tube 14 is disposed in a plane directly above the tube 12, but it is to be understood that such disposition is not critical. That is to say, in the event it were more feasible because of clearance and so on to have the tube 14 spaced laterally rather than vertically relative to the tube 12, the invention would nevertheless achieve its objectives in the manner to be described hereinafter.

The rear or discharge end of the tube 14 is designated 26, and as also seen particularly in Figure 2, is embraced by the inlet end of flexible hose 28.

Prior to entering into a detailed description of the manner in which the invention achieves its objectives, the more or less schematically presented elements of a conventional bevel edging machine as they appear in Figures 3 and 4 will be identified.

Thus, numeral 30 indicates the grinding wheel which the machine includes, and numeral 32 designates the motor driven shaft of said wheel. The V-groove of the grinding wheel is designated 34, and the rotational direction of said wheel is indicated by the arrow *a*. A typical lens 36 is clamped between the opposed jaws of a chuck suggested at 38.

Numeral 40 designates the independently and intermittently driven chuck spindle which is rotatably supported in the spaced free end portions 42 of a carriage 44, the opposite end portions of said carriage being pivotally mounted as at 46 to a stationary supporting structure of the machine, generally indicated by the numeral 48. The chuck spindle 40 is driven in the same direction as the grinding wheel.

The device 10 is suitably mounted on one arm of the carriage 44. Preferably the mounting means comprises an upstanding post 50 rigid with the carriage, and a vertically and rotatably adjustable cylinder 52 associated therewith. The lower end portion of said cylinder is hollow, and slidably receives the upper end portion of the post 50, as shown. The cylinder is maintained in the selected position of adjustment by a set screw. The upper end of the cylinder is solid, and has a horizontal bore therethrough for the slidable reception of the tube 12, which is also maintained in the selected disposition by a set screw as shown.

It is noted at this point that the particular mounting means illustrated and described forms no part of the instant invention, being merely a suggested or typical mouning. In other words, any suitable mounting means may be employed for supporting the device 10 from the carriage in proper disposition relative to an inserted lens.

*Operation*

It will be assumed that the machine is inactive, and that it is desired to apply a bevel edge to each of a plurality of lenses typified by the lens 36. With the machine inactive, the carriage 44 would be in the elevated disposition thereof illustrated in Figure 4. The main motor is now energized, thus causing the grinding wheel to rotate at the relatively high speed recited earlier by conventional means included in the machine, as is understood.

The independently driven chuck spindle 40 is idle at this time, it being here noted that energization of its driving motor is automatically effected by a micro-switch or the like, the operating plunger of which extends into the path of a portion of the carriage at or near the end of its downward movement.

Assuming now that a lens 36 has been properly placed between the padded jaws of the chuck 38, the water pipe tap, to which the remote end of the flexible hose 20 is connected, will be opened minutely, whereby a constant thin stream of water begins to advance through said hose into the tube 12. The machine is now in condition for continuous operation.

As noted hereinbefore, the carriage 44 is swung downwardly manually. Therefore, the attendant now grasps a handle rigid with said carriage to swing the latter downwardly about its pivot 46 until the peripheral edge of the lens 36 contacts the bottom of the grinding wheel V-groove 34.

As the carriage approaches the end of its downward movement (which incidentally is arrested by means provided on the machine for proper disposition of the lens relative to said groove), a portion of said carriage engages a micro-switch actuator for energizing the motor which drives the chuck spindle, as hereinbefore mentioned. In consequence, the lens 36 begins to revolve in the direction of arrow *b* at a very slow rate of speed in comparison to that of the grinding wheel. Simultaneously, the water flowing through tube 12 dribbles onto the lens via spout segment 16, as visibly demonstrated in Figure 3. The water drippings obviously trickle downwardly across the lens and into the V-groove 34. Thus the lens 36 is maintained in cooled status, minimizing if not entirely obviating breakage.

Assuming now that a complete revolution of the lens 36 has been had, the peripheral beveled edge designated 54 in Figure 4 will have been applied to, or formed on said lens.

Immediately following the completion of the bevel edging operation, the carriage 44 is elevated automatically to the position thereof portrayed in Figure 4, for removal of the treated lens, and insertion of the next lens to be bevel-edged. As should now be manifest, upward movement of the carriage about its pivotal mounting 46 also effects de-energization of the chuck spindle driving motor.

Now it will be remembered that the onward flow of water is constant, and under pressure, though slight. However, immediately subsequent to the initial upward movement of the carriage 44, the water in the supply tube 12 between the spout segment 16 thereof and the arcuate segment 22 of the drain tube 14 gravitates into the latter to be conducted to drainage via hose connection 28. Furthermore, all of the oncoming water reaching the device 10 during lens removal and insertion operations likewise flows into the tube 14 via the arcuate segment 22 thereof, irrespective of the time consumed in preparing the machine for the next operational cycle.

From the foregoing description and an inspection of the drawings, it should be apparent that the present invention provides a simple device for the attainment of its objective. As hereinbefore noted, the invention may be modified somewhat without departing from the spirit thereof as set forth in the claim hereunto appended.

What I claim is:

In combination with a bevel edging machine of the character described, said machine including a pivotally mounted carriage the free end of which rotatably supports a chuck for presenting a lens clamped therein to the action of a grinding wheel with said carriage swung downwardly: a device for cooling said lens by supplying a constant flow of water in drop form onto the periphery thereof during a beveling operation, and for obviating the dripping of water onto said machine when said carriage is swung upwardly from lens-beveling to lens-removal position without interrupting the constant flow of water, said device including: a first tube terminating at its forward end in a downturned arcuate spout segment for directing drops of water onto the periphery of the lens, and at its rear end in an inlet segment connected to one end of a flexible conduit leading from a source of water supply; a second tube disposed in spaced parallel relation relatively to the first tube, the second tube terminating at its forward end in an arcuate segment rigidly secured to an intermediate portion of the first tube in a manner to provide fluid communication between said tubes, and at its rear end in an outlet segment connected to one end of a flexible conduit leading to drainage; and means mounted on the carriage for supporting the device with the arcuate spout segment aforesaid of the first tube in proper disposition relatively to a lens clamped in said chuck.

References Cited in the file of this patent

UNITED STATES PATENTS

| | | |
|---|---|---|
| 1,396,123 | Joseph | Nov. 8, 1921 |
| 1,522,523 | Jerome | Jan. 13, 1925 |
| 1,630,264 | Gunning | May 31, 1927 |
| 1,651,532 | Maynard | Dec. 6, 1927 |
| 1,659,964 | Schultz | Feb. 21, 1928 |
| 1,662,023 | Baumberger | Mar. 6, 1928 |